United States Patent [19]

Berke et al.

[11] 4,303,394
[45] Dec. 1, 1981

[54] COMPUTER GENERATED IMAGE SIMULATOR

[75] Inventors: Herbert Berke, Maitland; John H. Allen, Winter Park; Joseph R. Owen, Orlando, all of Fla.

[73] Assignee: The United States of America as represented by the Secretary of the Navy, Washington, D.C.

[21] Appl. No.: 167,276

[22] Filed: Jul. 10, 1980

[51] Int. Cl.$^3$ ............................................. G09B 9/08
[52] U.S. Cl. ........................................ 434/40; 434/42
[58] Field of Search ...................... 434/38, 40, 43, 44, 434/20, 25, 26, 69, 36, 35, 34; 358/104

[56] References Cited

U.S. PATENT DOCUMENTS

| | | | |
|---|---|---|---|
| 3,205,303 | 9/1965 | Bradley | 434/43 |
| 3,507,993 | 4/1970 | Mulley . | |
| 3,619,912 | 11/1971 | Conant et al. | 358/104 |
| 3,862,358 | 1/1975 | Wolff | 434/29 |
| 3,892,051 | 7/1975 | Bunker | 358/104 |
| 3,895,183 | 7/1975 | Collier | 434/29 |
| 3,961,133 | 6/1976 | Bennett . | |
| 4,048,653 | 9/1977 | Spooner | 434/43 |
| 4,100,571 | 7/1978 | Dykes et al. | 434/43 |
| 4,103,435 | 8/1978 | Herndon | 358/104 |
| 4,106,218 | 8/1978 | Polstorff | 434/34 |

OTHER PUBLICATIONS

Aviation Week & Space Technology, May 1977, pp. 52–53.
Pratt, P. D., "A Helmet-Mounted Camera & Display System for Pilot Training", May 1973, pp. 136–137.

Primary Examiner—Vance Y. Hum
Attorney, Agent, or Firm—Robert F. Beers; Robert W. Adams; David S. Kalmbaugh

[57] ABSTRACT

A computer generated image simulator is disclosed for scanning a visual target and then providing a visual image of the target which is to be displayed upon a reflective display screen such that a trainee pilot may observe the target. A head tracker which monitors the position of the trainee pilot's head, and an eye tracker which monitors the position of the trainee pilot's eyes, respectively provide head and eye orientation signals to be processed by electronic circuitry such that the target which is projected upon the reflective display screen by a helmet mounted projector will be orientated upon the screen in accordance with the orientation of the trainee pilot's head.

14 Claims, 3 Drawing Figures ns the image of the visual target which appears upon the television screen, and then supplies to a projector mounted upon a helmet worn by the trainee pilot a video signal. The projector, in turn, projects the visual target upon a reflective display screen such that the trainee pilot may observe the aforementioned target.

COMPUTER GENERATED IMAGE SIMULATOR

BACKGROUND OF THE INVENTION

1. Field of the Invention

This invention relates generally to visual display apparatus. In particular, this invention relates to an image simulator for providing a wide angle visual display to a trainee pilot.

2. Description of the Prior Art

There are available in the prior art a wide variety of visual display systems which may be utilized as a training device for flight simulation. In particular, a number of such systems of the prior art incorporate therein a computer image generator which provides a visual image to be displayed upon a reflective display screen by a visual projector.

U.S. Pat. No. 4,048,653 to A. M. Spooner illustrates the state of the art in the field of the present invention. There, a helmet mounted arrangement for projecting an image into a pilot's line of sight is disclosed. The image is presented onto a viewing screen as two images spaces slightly apart, with the right image polarized to be visible by only the right eye of the pilot, and the left image similarly polarized from the left eye. The scene viewed may be from a variety of sources, including a computer image generator.

In addition, U.S. Patent Application entitled Pilot Helmet Mounted CIG Display With Eye Coupled Area of Interest, by J. F. Harvey, W. S. Chambers, and J. J. Kulik, Ser. No. 104,521, illustrates the use of a computer and computer image generator to generate a visual image for display upon a reflective display screen.

While performing quite well for their intended purpose of generating a visual image to be displayed on a reflective display screen, a malfunction of unavailability of either the computer or computer image generator renders the above mentioned systems inoperative. In addition, a device is needed for generating a simulated computer generated image so as to test the aforementioned systems.

SUMMARY OF THE INVENTION

The subject invention overcomes some of the difficulties inherent within the field of computer generated image simulation, including those mentioned above, in that it comprises a relatively simple computer generated image simulator. In particular, the subject invention was designed for the testing of the computer image generator display described in the aforementioned U.S. patent application, Ser. No. 104,521.

Included in the subject invention are a head tracker for monitoring the horizontal, vertical, and rotational movement of the head of a trainee pilot, and an eye tracker for monitoring the horizontal and vertical movement of the eyes of the trainee pilot.

Servomechanism means, which has attached thereto a visual target, rotates the visual target in accordance with the rotational movement of the head of the trainee pilot. A first television camera continuously scans the aforementioned visual target so as to allow for the broadcasting of the visual target upon the television screen of a display apparatus.

A unique combination of summing circuits, delay circuits, and sawtooth waveform generators position the visual target upon the television screen of the display apparatus in accordance with the orientation of the head of the trainee pilot. A second television camera scans the image of the visual target which appears upon the television screen, and then supplies to a projector mounted upon a helmet worn by the trainee pilot a video signal. The projector, in turn, projects the visual target upon a reflective display screen such that the trainee pilot may observe the aforementioned target.

DESCRIPTION OF THE PREFERRED EMBODIMENT

Figure 1:
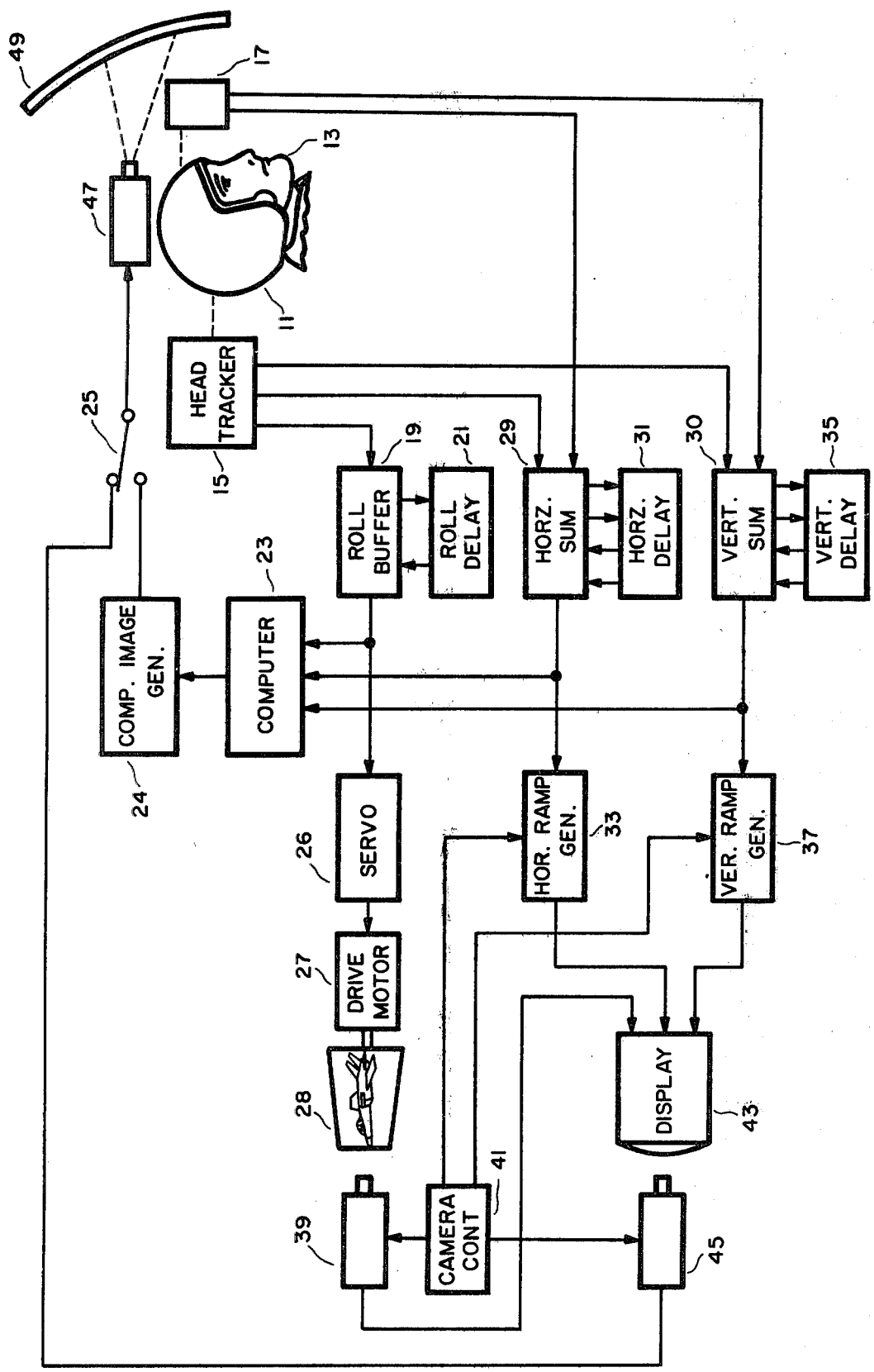
FIG. 1 is a block diagram of the computer generated image simulator constituting the subject invention.

The preferred embodiment of the subject invention will now be discussed with all of the figures of the drawing, wherein like parts are designated by like reference numerals, insofar as it is possible and practical to do so.

Referring now to FIG. 1, there is shown a helmet 11 adapted to be worn upon the head of a trainee pilot 13. Mechanically connected to helmet 11 is a head tracker 15 which continuously measures the orientation of the head of trainee pilot 13.

In addition, helmet 11 has mechanically connected thereto an eye tracker 17 which is in alignment with, and continuously measures, the line of sight of trainee pilot 13.

At this time it may be noteworthy to mention that the head tracker 15 may be a head tracker which is manufactured by the Polhemus Corporation of Essex Junction, Vermont, and eye tracker 17 may be an Eye Movement Monitor Model 200, manufactured by Gulf and Western Research, Inc., of Waltham, Massachusetts.

Connected to the first data output of head tracker 15 is the data input of a roll buffer circuit 19, the first data output of which is connected to the input of a roll delay circuit 21, with the output thereof connected to the delay input of roll buffer circuit 19. The second data output of roll buffer circuit 19 is connected to the first input of a computer 23, the output of which is connected to the input of a computer image generator 24, with the output thereof connected to the first input of a selector switch 25. In addition, the second data output of roll buffer 19 is connected to the input of a servomechanism circuit 26, the output of which is connected to a drive motor 27. Affixed to the shaft of drive motor 27 is a target 28 which may be, for example, an aircraft.

It may be noteworthy to mention at this time that computer 23 may be an SEL 32/55 digital computer manufactured by Systems Engineering Lab., Inc. of Fort Lauderdale, Florida, and computer image generator 35 may be a Comp-U-Scene Computer Image Generator manufactured by General Electric, Inc.

The second and third data outputs of head tracker 15 are respectively connected to the first data input of a horizontal summing circuit 29, and the first data input of vertical summing circuit 30. Likewise, the first and second data outputs of eye tracker 17 are respectively connected to the second data input of horizontal summing circuit 29 and the second data input of vertical summing circuit 30.

The first and second data outputs of horizontal summing circuit 29 are respectively connected to the first and second inputs of a horizontal delay circuit 31, the first and second outputs of which are respectively connected to the first and second delay inputs of horizontal connected to the first and second delay inputs of horizontal summing circuits 29, with the third data output thereof connected to the data input of horizontal ramp generator 33.

Similarly, the first and second data outputs of vertical summing circuit 30 are respectively connected to the first and second inputs of a vertical delay circuit 35, the first and second outputs of which are respectively connected to the first and second delay inputs of vertical summing circuit 30, with the third data output thereof connected to the data input of a vertical ramp generator 37.

It may be noteworthy to mention that an electronic circuit which may be utilized as horizontal ramp generator 33 and vertical ramp generator 37 is described in a U.S. Patent Application entitled A Sawtooth Waveform Generating Circuit For Utilization In A Helmet Mounted Display, by John H. Allen and Herbert Berke, Navy Case No. 64,297, filed concurrently with this application.

Positioned in front of target 28 is a television camera 39, which has an input connected to the first control output of a camera controller 41, and an output connected to the first input of a television display apparatus 43. Camera controller 41, in turn, has a first sync output connected to the sync input of horizontal ramp generator 33, a second sync output connected to the sync input of vertical ramp generator 37, and a second control output connected to the input of a television camera 45.

The output of television camera 45, which is positioned in front of the television screen of display apparatus 43, is connected to the second input of selector switch 25, with the output thereof connected to the input of a projector 47 which is mounted upon helmet 11. Spatially disposed downstream from projector 47 is a reflective display screen 49.

Figure 2:
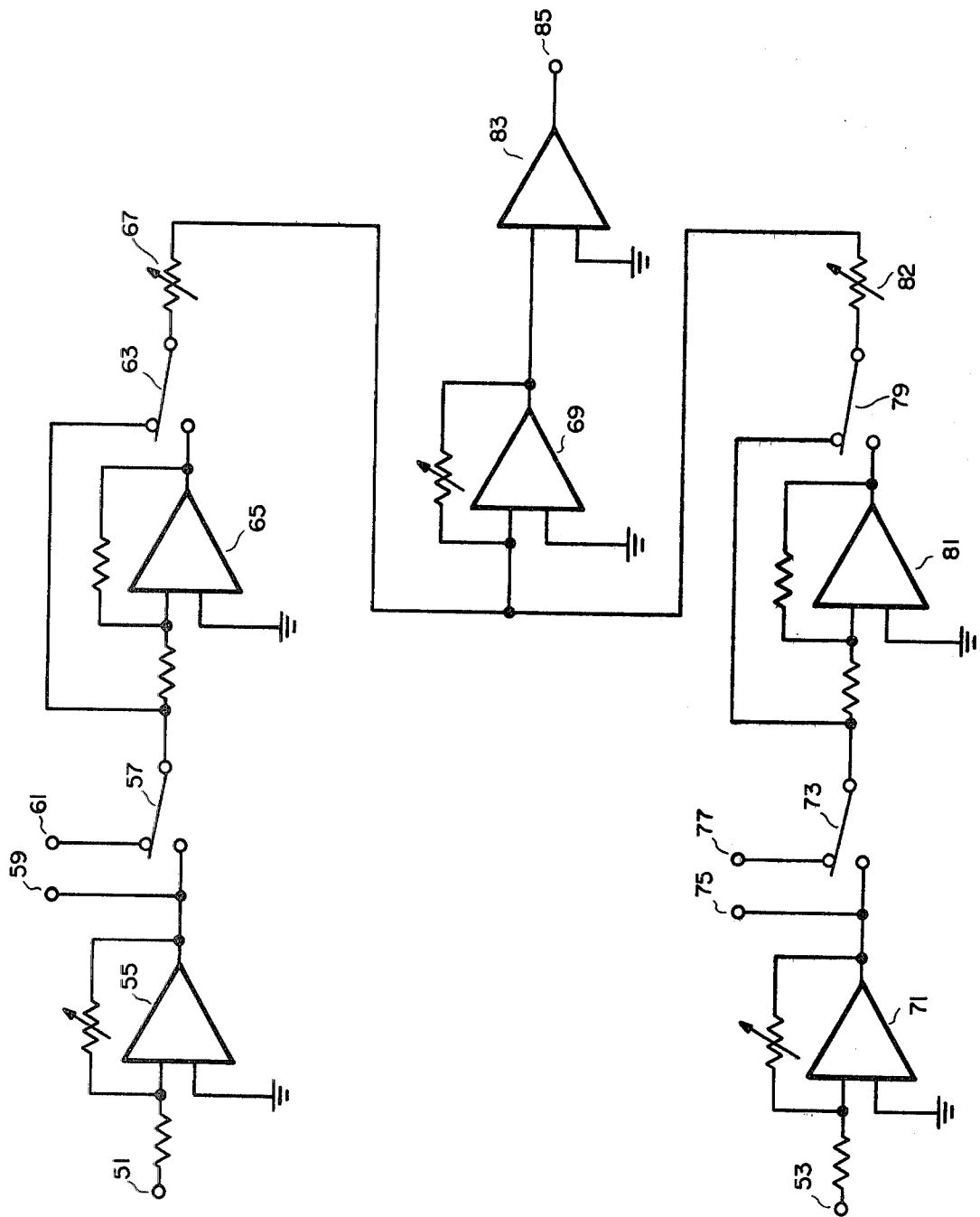
FIG. 2 is an electrical schematic diagram of one of the summing circuits of FIG. 1.

Referring now to FIGS. 1 and 2, there is shown in FIG. 2 a schematic display of horizontal summing circuit 29. It should be noted that the schematic diagram for vertical summing circuit 30 is identical to that of horizontal summing circuit 29. Hence, for the sake of keeping this disclosure as simple as possible, only horizontal summing circuit 29 will be discussed at this time.

Horizontal summing circuit 29 comprises an input terminal 51 which is connected to the second data output of head tracker 15, and an input terminal 53 which is connected to the first data output of eye tracker 17.

Input terminal 51 is, in turn, connected to the input of a variable gain amplifier 55, the output of which is connected to the first input of a selector switch 57, and an output terminal 59. Output terminal 59 is connected to the first input of horizontal delay circuit 31, with the first output thereof connected to an input terminal 61. Input terminal 61 is connected to the second input of selector switch 57, the output of which is connected to the first input of a selector switch 63, and the input of an inverting amplifier 65. The output of inverting amplifier 65 is connected to the second input of selector switch 63, the output of which is connected through a variable resistor 67 to the input of a summing amplifier 69.

Input terminal 53 is connected to a variable gain amplifier 71, the output of which is connected to the first input of a selector switch 73 and an output terminal 75. Output terminal 75 is connected to the second input of horizontal delay circuit 31, with the second output thereof connected to an input terminal 77. Input terminal 77, in turn, is connected to the second input of selector switch 73, the output of which is connected to the first input of a selector switch 79, and the input of an inverting amplifier 81. The output of inverting amplifier 81 is connected to the second input of selector switch 79, the output of which is connected through variable resistor 82 to the input of summing amplifier 69. The output of summing amplifier 69 is connected to the input of a buffer amplifier 83, the output of which is connected to an output terminal 85. The output terminal 85 is, in turn, connected to the data input of horizontal ramp generator 33.

At this time it may be mentioned that the electronics circuit of FIG. 2 may be utilized as roll buffer 19 by appropriately connecting the aforementioned electronics circuit to head tracker 15, roll delay circuit 21, and servo-mechanism circuit 26 in the following manner. Input terminal 51 is connected to the first output of head tracker 15, output terminal 59 is connected to the input of roll delay circuit 21, the output of which is connected to input terminal 61, and the output terminal 85 is connected to the input of servo-mechanism circuit 26. In addition, input terminals 53 and 77 are connected to a ground, not shown.

Figure 3:
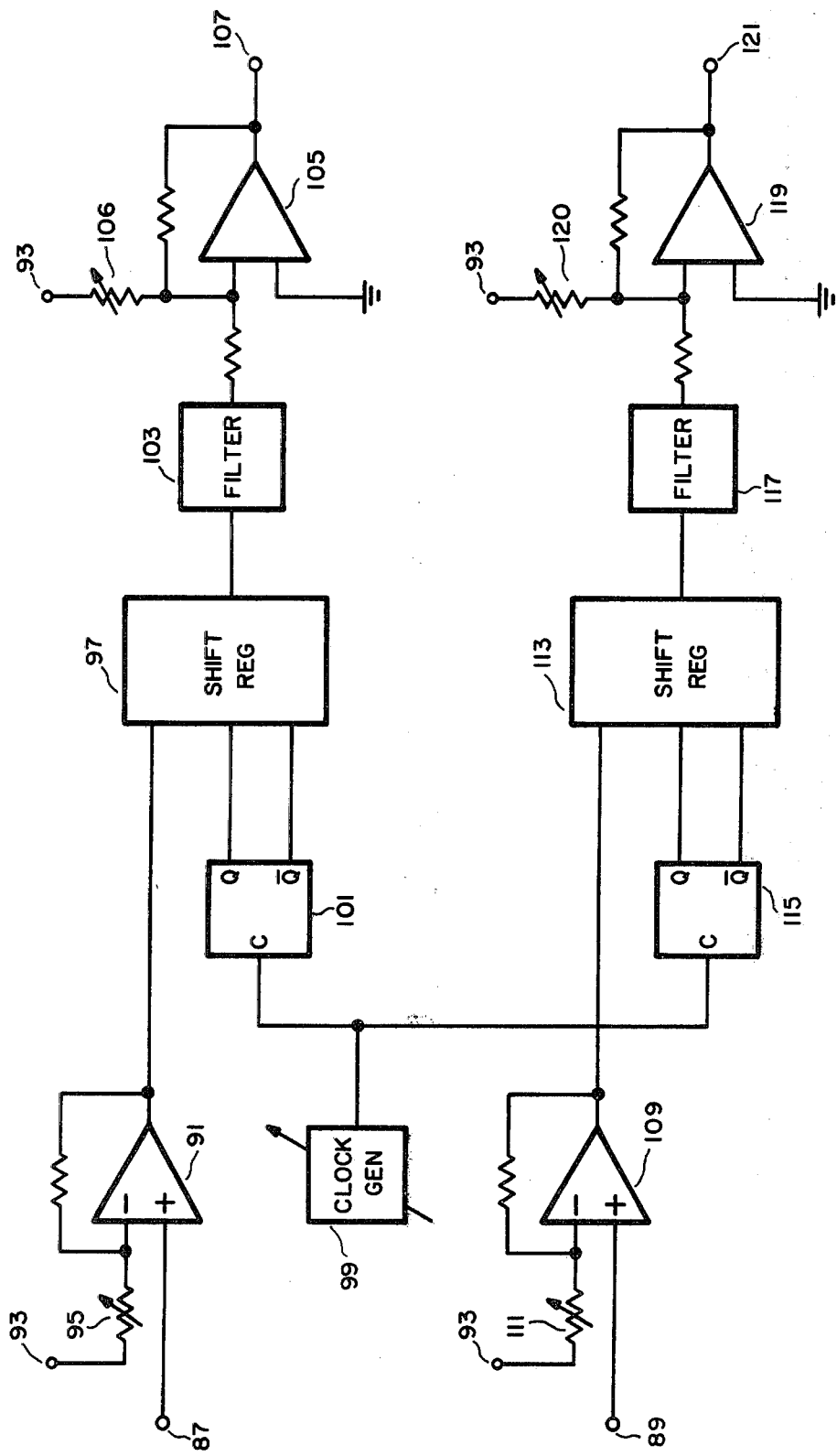
FIG. 3 is an electrical schematic diagram of one of the delay circuits of FIG. 1.

Referring now to FIGS. 1 and 3, there is shown a schematic diagram of horizontal delay circuit 31. It should be noted that the schematic diagram for vertical delay circuit 35 is identical to that of horizontal delay circuit 31. Hence, for the sake of keeping this disclosure as simple as possible, only horizontal delay circuit 31 will be disclosed at this time.

Horizontal delay circuit 31 comprises an input terminal 87 connected to the first data output of horizontal summing circuit 29, and an input terminal 89 connected to the second data output of horizontal summing circuit 29.

Output terminal 87 is connected to the positive input of a level shifting amplifier 91. A direct current voltage source 93 is connected through a variable resistor 95 to the negative input of level shifting amplifier 91, the output of which is connected to the data input of an analog shift register 97.

The output of an adjustable frequency clock signal generator 99 is connected to the clock input of a trigger flip-flop 101, the Q output of which is connected to the first clock input of analog shift register 97 and the $\overline{Q}$ output of which is connected to the second clock input of analog shift register 97. The output of shift register 97 is connected to the input of a filter network 103, with the output thereof connected to the input of a level shifting amplifier 105. Direct current voltage source 93 is connected through a variable resistor 106 to the input of level shifting amplifier 105, the output of which is connected to an output terminal 107. Output terminal 107, in turn, is connected to the first delay input of horizontal summing circuit 29.

Input terminal 89 is connected to the positive input of a level shifting amplifier 109. Direct current voltage source 93 is connected through a variable resistor 111 to the negative input of level shifting amplifier 109, the output of which is connected to the data input of an analog shift register 113.

It may be noted at this time that analog shift registers 97 and 113 may be conventional and commercially available analog shift register such as, for example, an Analog Delay Line, Model SAD-1024, manufactured by Reticon, Inc., of Sunnyvale, California.

The output of clock signal generator 99 is connected to the clock input of a trigger flip-flop 115, the Q and the $\overline{Q}$ outputs of which are respectively connected to the first and second clock inputs of analog shift register 113, with the output thereof connected to the input of a filter network 117.

The output of filter network 117 is connected to the input of a level shifting amplifier 119. Direct current voltage source 93 is connected through a variable resistor 120 to the input of level shifting amplifier 119, the output of which is connected to an output terminal 121.

At this time it may be mentioned that the electronics circuit of FIG. 3 may be utilized as roll delay circuit 21 by appropriately connecting the aforementioned electronics circuit to roll buffer 19 in the following manner. Input terminal 87 is connected to the first data output of roll buffer 19, and output terminal 107 is connected to the delay input of roll buffer 19. In addition, input terminal 89 is connected to ground, not shown.

The operation of the subject invention will now be discussed in conjunction with all of the figures of the drawing.

Referring now to FIG. 1, there is shown head tracker 15 which monitors the horizontal, vertical, and rotational movement of the head of trainee pilot 13 while the aforementioned trainee pilot observes reflective display screen 49 and visual target 28 which is displayed thereon. Head tracker 15 then provides at the data outputs thereof horizontal, vertical, and rotational head orientation signals which are indicative of such movement.

Similarly, eye tracker 17 monitors the horizontal and vertical movement of each eye of trainee pilot 13 while trainee pilot 13 observes reflective display screen 49. Eye tracker 17 then provides at the data outputs thereof horizontal and vertical eye orientation signals which are indicative of such movement.

The rotational head orientation signal provided by head tracker 15 is supplied to the data input of roll buffer 19 which either passes the aforementioned signal therethrough to the first input of computer 23, or supplies the rotational head orientation signal to the input of roll delay circuit 21.

Similarly, the horizontal head orientation signal provided by head tracker 15, and the horizontal eye orientation signal provided by eye tracker 17 are either combined by horizontal summing circuit 29 which then supplies the resulting signal to the second input of computer 23, or supplied to the first and second inputs of horizontal delay circuit 31.

Likewise, the vertical head orientation signal provided by head tracker 15 and the vertical eye orientation signal provided by eye tracker 17 are either combined by vertical summing circuit 30 which then supplies the resulting signal to the third input of computer 23, or supplied to the first and second inputs of vertical delay circuit 35.

At this time it may be noted that for a complete description of the operation of computer 23 and computer image generator 24, reference is hereby made to U.S. patent application entitled Pilot Helmet Mounted Display With Eye Coupled Area of Interest, By James F. Harvey, Walter S. Chambers, and John J. Kulik, Ser. No. 104,521. Hence, for the sake of keeping this disclosure as simple as possible, the operation of the aforementioned computer 23, and computer image generator 24 will not be discussed at this time. In addition, it may be noted that the subject invention is to be utilized as a substitute for computer 23 and computer image generator 24. This, in turn, allows for the simulation of a computer generated image whenever computer 23 or computer image generator 24 are not available. Thus, for example, if computer image generator 24 were to malfunction, the subject invention would still allow for the projection of a visual image upon reflective display screen 49 as will be discussed more fully below.

The rotational head orientation signal supplied to the input of roll delay circuit 21 is delayed thereby for a predetermined time interval, and then supplied to the delay input of roll buffer circuit 19, which amplifies the aforementioned orientation signal.

The delayed rotational head orientation signal is then supplied to the input of servomechanism circuit 26 which activates drive motor 27 so as to rotate target 28 in accordance with the rotational movement of the head of trainee pilot 13 as sensed by head tracker 15.

Controller 41 supplies to the control input of television camera 39 a first control signal so as to effect the scanning of visual target 28 by television camera 39. Television camera 39, in turn, supplies a video signal to the first data input of television display apparatus 43 which broadcasts on the television screen thereof target 28 and the rotational movement associated therewith.

The horizontal head and eye orientation signals respectively supplied to the first and second data inputs of horizontal delay circuit 31 are delayed thereby for a predetermined time interval. The delayed horizontal head and eye orientation signals are then supplied respectively to the first and second delay inputs of horizontal summing circuit 29, which combines the aforementioned signals so as to form a horizontal movement indicator signal at the output thereof.

Likewise, the vertical head and eye orientation signals respectively supplied to the first and second data inputs of vertical delay circuit 35 are delayed thereby for a predetermined time interval. The delayed vertical head and eye orientation signals are then supplied respectively to the first and second delay inputs of vertical summing circuit 30, which combines the aforementioned signals so as to form a vertical movement indicator signal at the output thereof.

It should be noted at this time that roll delay circuit 21, horizontal delay circuit 31, and vertical delay circuit 35 are utilized to delay the orientation signals supplied to the inputs thereof so as to simulate the delay time inherent within the operation of computer 23, and computer image generator 24, as will be discussed more fully below.

Camera controller 41 supplies to the sync input of horizontal ramp generator 33 a first sync signal which generates a sawtooth waveform signal in response to the aforementioned sync signal. Horizontal ramp generator 33 then combines the sawtooth waveform signal generated thereby with the horizontal movement indicator signal provided by horizontal summing circuit 29 so as to form at the output thereof a first raster drive signal which is then supplied to the second data input of television display apparatus 43.

In addition, camera controller 41 supplies to the sync input of vertical ramp generator 37 a second sync signal which generates a sawtooth waveform signal in response to the aforementioned sync-signal. Vertical ramp generator 37 then combines the sawtooth waveform signal generated thereby with the vertical movement indicator signal provided by vertical summing circuit 30 so as to form at the output thereof a second raster drive signal which is then supplied to the third data input of television display apparatus 43.

As mentioned above, the operation of horizontal ramp generator 33 and vertical ramp generator 37 is fully described in U.S. Application, Navy Case No. 64,297, and therefore will not be discussed in detail in this application.

The first and second raster drive signals provided respectively by horizontal ramp generator 33 and vertical ramp generator 37, and the video signal provided by television camera 39, position visual target 28 upon the television screen of visual display apparatus 43 in accordance with the orientation of the head and eyes of trainee pilot 13 as sensed by head tracker 15 and eye tracker 17. Camera controller 41 supplies to the input of television camera 45 a second control signal so as to effect the scanning thereby of visual target 28 upon the television screen of television display apparatus 43. Television camera 45, in turn, supplies a video signal through selector switch 25 to the input of projector 47, which projects upon reflective display screen 49 a visual image of target 28 such that trainee pilot 13 may observe the aforementioned target.

As mentioned above, the schematic diagram disclosed in FIG. 2 illustrates horizontal summing circuit 29, as well as a vertical summing circuit 30 and roll buffer 19. Because all of the aforementioned circuits operate in exactly the same way, and for the sake of keeping the disclosure as simple as possible, only the operation of horizontal summing circuit 29 will be described at this time.

Referring now to FIGS. 1 and 2, the horizontal head orientation signal provided by head tracker 15 is supplied through input terminal 51 to the input of amplifier 55 which amplifies the aforementioned signal and then supplies the amplified horizontal head orientation signal to the first input of selector switch 57. In addition, as will be discussed more fully below, the amplified horizontal head orientation signal is supplied through output terminal 59 to the first input of horizontal delay circuit 31 which delays the signal for a predetermined time interval, and then supplies the delayed horizontal head orientation signal through input terminal 61 to the second input of selector switch 57. The delayed horizontal head orientation signal then passes through selector switch 57 to the second input of selector switch 63, and the input of inverting amplifier 65. Inverting amplifier 65, in turn, inverts the delayed horizontal head orientation signal and then supplies the aforementioned signal to the first input of selector switch 63.

If it is desired to utilize computer 23 and computer image generator 24 to generate a visual image to be displayed upon reflective display screen 49, as described in U.S. patent application Ser. No. 104,521, then selector 57 will be positioned such that the horizontal head orientation signal will pass directly therethrough to the second input of selector switch 63, and the input of inverting amplifier 65. Inverting amplifier 65, in turn, inverts the horizontal head orientation signal and supplies the inverted horizontal head orientation signal to the first input of selector switch 63.

At this time it may be noteworthy to mention that roll buffer 19, horizontal summing circuit 29, and vertical summing circuit 30 allow for the inverting of the head and eye orientation signals provided by head tracker 15 and eye tracker 17 such that the subject invention may be compatible with a variety of computer image generated training systems. However, the operation of the subject invention does not require that the aforementioned head and eye orientation signals be inverted. Accordingly, the delayed horizontal head orientation signal from horizontal delay circuit 31 will pass through selector switches 57 and 63, and variable resistor 67 to the input summing amplifier 69.

The horizontal eye orientation signal provided by eye tracker 17 is supplied to the input of amplifier 71, which amplifies the aforementioned signal. The amplified horizontal eye orientation signal is, in turn, supplied through output terminal 75 to the second input of horizontal delay circuit 31, which delays the eye orientation signal for a predetermined time interval, and then through input terminal 77, selector switches 73 and 79, and variable resistor 82 to the input of summing amplifier 69. Summing amplifier 69 combines the delayed horizontal head and eye orientation signals so as to form the aforementioned horizontal movement indicator signal which is amplified by buffer 83 and then supplied through output terminal 85 to the data input of horizontal ramp generator 33.

If it is desired to utilize computer 23 and computer image generator 24 to generate a visual image to be displayed upon reflective display screen 49, selector switch 73 is positioned such that the horizontal eye orientation signal will pass therethrough to the second input of selector switch 79. In addition, as discussed previously, when utilizing computer 23 and computer image generator 24, selector switch 57 is positioned so that the horizontal head orientation signal will pass directly therethrough to the second input of selector switch 63. Further, it may be noted that inverting amplifier 81 allows for the inverting of the horizontal eye orientation singal provided by eye tracker 17. This, in turn, as discussed above, allows the subject invention to be compatible with a variety of computer image generated training systems.

As mentioned above, the schematic diagram disclosed in FIG. 3 illustrates horizontal delay circuit 31, as well as vertical delay circuit 35, and roll delay circuit 21. Because all of the aforementioned delay circuits operate in exactly the same manner, and for the sake of keeping this disclosure as simple as possible, only the operation of horizontal delay circuit 31 will be described at this time.

Referring now to FIGS. 1 and 3, the horizontal head orientation signal provided by head tracker 15 passes through horizontal summing circuit 29, as discussed above, and input terminal 87 to the positive input of amplifier 91, which shifts the voltage level of the horizontal head orientation signal to a predetermined value such that the aforementioned signal may be supplied to the data input of shift register 97.

Clock generator 99 provides at the output thereof a master clock signal, the frequency of which is divided by two by flip-flop 101, so as to provide at the Q and $\overline{Q}$ outputs thereof first and second clock signals. The first and second clock signals provided by flip-flop 101 are, in turn, supplied respectively to the first and second clock inputs of shift register 97, which in response thereto delays the horizontal head orientation signal for a predetermined time interval. The delayed horizontal head orientation signal is then passed through filter network 103, which removes therefrom any clock noise, to the input of amplifier 105. Amplifier 105, in turn, shifts the voltage level of the delayed horizontal head orientation signal to a predetermined value such that the aforementioned signal may be supplied through output terminal 107 to the first delay input of horizontal summing circuit 29.

Likewise, the horizontal eye orientation signal provided by eye tracker 17 is supplied through horizontal summing circuit 29 and input terminal 89 to the input of amplifier 109, which voltage level shifts the horizontal eye orientation signal such that the aforementioned signal may be supplied to the data input or shift register 113.

Clock generator 99 supplies the aforementioned master clock signal to the clock input of flip-flop 115, the frequency of which is divided by two by flip-flop 115 so as to provide at the Q and $\overline{Q}$ outputs thereof first and second clock signals. The first and second clock signals provided by flip-flop 115 are, in turn, supplied respectively to the first and second clock inputs of shift register 113, which in response thereto delays the horizontal eye orientation signal for a predetermined time interval. The delayed horizontal eye orientation signal is then passed through filter network 117, which removes therefrom any clock noise, to the input of amplifier 119. Amplifier 119, in turn, voltage level shifts the delayed horizontal eye orientation signal, and then supplies the aforementioned signal through output terminal 121 to the second delay input of horizontal summing circuit 29.

At this time it may be noteworthy to mention that shift registers 97 and 113 are preset so as to delay the horizontal head and eye orientation signal for a predetermined time interval which is equivalent to the time period required for computer 23 and computer image generator 24 to generate a visual image to be displayed upon reflective display screen 49.

From the foregoing, it may be seen that the subject invention comprises a new, unique, and exceedingly useful computer generated image simulator. Obviously, many modifications and variations of the present invention are possible in light of the above teachings. It is, therefore, to be understood that within the scope of the appended claims the invention may be practiced otherwise than as sepcifically described.

What is claimed is:

1. A computer generated image simulator comprising, in combination:

a helmet adapted to be worn upon the head of a trainee pilot;

head tracking means connected to said helmet for continuously monitoring the horizontal, vertical, and rotational movement of the head of said trainee pilot, and for providing at the output thereof horizontal, vertical, and rotational head orientation signals indicative of such movement, said head tracking means having first, second, and third outputs;

eye tracking means connected to said helmet in such a manner so as to be in alignment with the line of sight of said trainee pilot for continuously monitoring the horizontal and vertical movement of the eyes of said trainee pilot, and for providing at the output thereof horizontal and vertical eye orientation signals indicative of such movement, said eye tracking means having first and second outputs;

timing circuit means having an input connected to the first output of said head tracking means for delaying said rotational head orientation signal for a first predetermined time interval;

a visual target;

servomechanism means effectively connected between the output of said timing circuit means and said visual target for effecting the rotational movement of said visual target in accordance with said delayed rotational head orientation signal;

first summing circuit means having a first input connected to the second output of said head tracking means, a second input connected to the first output of said eye tracking means and an output for delaying said horizontal head and eye orientation signals for a second predetermined time interval and for combining said delayed horizontal head and eye orientation signals so as to form a horizontal movement indicator signal;

second summing circuit means having a first input connected to the third output of said head tracking means, a second input connected to the second output of said eye tracking means and an output for delaying said vertical head and eye orientation signals for a third predetermined time interval, and for combining said delayed vertical head and eye orientation signals so as to form a vertical movement indicator signal;

first camera means positioned in front of said visual target and having an input and an output for continuously scanning said visual target and the rotational movement associated therewith, and for providing a first video signal in response to the scanning of said visual target thereby;

control means having a first control output connected to the input of said first camera means, a second control output, a first sync output, and a second sync output for generating a first control signal so as to effect the scanning of said visual target by said first camera means, a second control signal, a first sync signal, and a second sync signal;

horizontal ramp generating means having a sync input connected to the first sync output of said control means, a data input connected to the output of said first summing circuit means, and an output for producing a first sawtooth waveform signal in response to said first sync signal, and for combining said first sawtooth waveform signal with said horizontal movement indicator signal so as to provide at the output thereof a first raster drive signal;

vertical ramp generating means having a sync input connected to the second sync output of said control means, a data input connected to the output of said second summing circuit means and an output for producing a second sawtooth waveform signal in response to said second sync signal and for combining said second sawtooth waveform signal with said vertical movement indicator signal so as to provide at the output thereof a second raster drive signal;

image display means having a television screen therein, and a trio of data inputs with the trio of data inputs thereof respectively connected to the output of said first camera means, the output of said horizontal ramp generating means, and the output of said vertical ramp generating means for reproducing upon said television screen said visual target and the rotational movement associated therewith in response to said first video signal, and for varying the position of said visual target upon said television screen in accordance with the movement of the head and eyes of said trainee pilot in response to said first and second raster drive signals;

second camera means positioned in front of the television screen of said image display means and having an input connected to the output of said control means, and an output for scanning the visual target reproduced upon the television screen of said image display means, and for providing a second video signal in response to the scanning of said visual target thereby;

a reflective display screen substantially encompassing the field of view of said trainee pilot; and means mounted upon said helmet and having an input effectively connected to the output of said second camera means for projecting upon said reflective display screen said visual target in response to said second video signal.

2. The computer generated image simulator of claim 1, wherein said servomechanism means comprises:

a servomechanism circuit having an input connected to the output of said timing circuit means; and a drive motor having an input connected to the output of said servomechanism circuit.

3. The computer generated image simulator of claim 1, wherein said visual target comprises an aircraft.

4. The computer generated image simulator of claim 1, wherein said timing circuit means comprises:

a variable gain amplifier having an input connected to the first output of said head tracking means, and an output;

a first level shifting amplifier having an output connected to the output of said variable gain amplifier, and an output;

an adjustable frequency clock signal generator having an output;

a trigger flip-flop having a clock input connected to the output of said adjustable frequency clock signal generator, a Q output, and a $\overline{Q}$ output;

an analog shift register having a first clock input connected to the Q output of said trigger flip-flop, a second clock input connected to the $\overline{Q}$ output of said trigger flip-flop, a data input connected to the output of said first level shifting amplifier, and an output;

a filter network having an input connected to the output of said analog shift register, and an output;

a second level shifting amplifier having an input connected to the output of said filter network, and an output;

a first selector switch having a first input connected to the output of said first variable gain amplifier, a second input connected to the output of said second level shifting amplifier, and an output;

an inverting amplifier having an input connected to the output of said first selector switch, and an output;

a second selector switch having a first input connected to the output of said inverting amplifier, a second input connected to the output of said first selector switch, and an output;

a summing amplifier having an input connected to the output of said second selector switch, and an output; and a buffer amplifier having an input connected to the output of said summing amplifier.

5. The computer generated image simulator of claim 1, wherein each of said summing circuit means comprises:

a first input terminal;

a first variable gain amplifier having an input connected to said first input terminal, and an output;

a second input terminal;

a second variable gain amplifier having an input connected to said second input terminal, and an output;

a first level shifting amplifier having an input connected to the output of said first variable gain amplifier, and an output;

a second level shifting amplifier having an input connected to the output of said second variable gain amplifier, and an output;

an adjustable frequency clock signal generator having an output;

a first trigger flip-flop having a clock input connected to the output of said adjustable frequency clock signal generator, a Q output, and a $\overline{Q}$ output;

a first analog shift register having a first clock input connected to the Q output of said first trigger flip-flop, a second clock input connected to the $\overline{Q}$ output of said first trigger flip-flop, a data input connected to the output of said first level shifting amplifier, and an output;

a second trigger flip-flop having a clock input connected to the output of said adjustable frequency clock signal generator, a Q output, and a $\overline{Q}$ output;

a second analog shift register having a first clock input connected to the Q output of said second trigger flip-flop, a second clock input connected to the $\overline{Q}$ output of said second trigger flip-flop, a data input connected to the output of said second level shifting amplifier, and an output;

a first filter network having an input connected to the output of said first analog shift register, and an output;

a second filter network having an input connected to the output of said second analog shift register, and an output;

a third level shifting amplifier having an input connected to the output of said first filter network, and an output;

a fourth level shifting amplifier having an input connected to the output of said second filter network, and an output;

a first selector switch having a first input connected to the output of said first variable gain amplifier, a second input connected to the output of said third level shifting amplifier, and an output;

a second selector switch having a first input connected to the output of said second variable gain amplifier, a second input connected to the output of said fourth level shifting amplifier, and an output;

a first inverting amplifier having an input connected to the output of said first selector switch, and an output;

a second inverting amplifier having an input connected to the output of said second selector switch, and an output;

a third selector switch having a first input connected to the output of said first inverting amplifier, a second input connected to the output of said first selector switch, and an output;

a fourth selector switch having a first input connected to the output of said second inverting amplifier, a second input connected to the output of said second selector switch, and an output;

a summing amplifier having an input effectively connected to the output of said third and fourth selector switches, and an output; and a buffer amplifier having an input connected to the output of said variable gain amplifier.

6. The computer generated image simulator of claim 1, further characterized by:

a computer having a first input connected to the output of said timing circuit means, a second input connected to the output of said first summing circuit means, and a third input connected to the output of said second summing circuit means;

a computer image generator having an input connected to the output of said computer; and a selector switch having a first input connected to the output of said computer image generator, a second input connected to the output of said second camera means, and an output connected to the input of said projecting means.

7. A head trackable wide angle visual display system simulator comprising, in combination:

a helmet adapted to be worn upon the head of a trainee pilot;

a head tracker connected to said helmet, said head tracker having first, second, and third data outputs;

an eye tracker connected to said helmet in such a manner so as to be in alignment with the line of sight of said trainee pilot, said eye tracker having first and second data outputs;

a roll buffer circuit having a data input connected to the first data output of said head tracker, a delay input, a first data output, and a second data output;

a roll delay circuit having an input connected to the first data output of said roll buffer circuit and an output connected to the delay input of said roll buffer circuit;

a horizontal summing circuit having a first data input connected to the second data output of said head tracker, a second data input connected to the first data output of said eye tracker, first and second delay inputs, and first, second, and third data outputs;

a horizontal delay circuit having first and second inputs respectively connected to the first and second data outputs of said horizontal summing circuit, and first and second outputs respectively connected to the first and second delay inputs of said horizontal summing circuit;

a vertical summing circuit having a first data input connected to the third data output of said head tracker, a second data input connected to the second data output of said eye tracker, first and second delay inputs, and first, second, and third data outputs;

a vertical delay circuit having first and second inputs respectively connected to the first and second data outputs of said vertical summing circuit, and first and second outputs respectively connected to the first and second delay inputs of said vertical summing circuit;

a camera controller having a first sync output, a second sync output, a first control output, and a second control output;

a horizontal ramp generator having a data input connected to the third data output of said horizontal summing circuit, a sync input connected to the first sync output of said camera controller, and an output;

a vertical ramp generator having a data input connected to the third data output of said vertical summing circuit, a sync input connected to the second sync output of said camera controller, and an output;

a servomechanism having an input connected to the second data output of said roll buffer circuit, and an output;

a drive motor having a drive shaft, and an input connected to the output of said servomechanism;

a visual target affixed to the shaft of said drive motor;

a first television camera positioned in front of said visual target, said first television camera having an input connected to the first control output of said camera controller, and an output;

a display apparatus having a television screen therein, and a trio of data inputs with the trio of data inputs thereof respectively connected to the output of said first television camera, the output of said horizontal ramp generator, and the output of said vertical ramp generator;

a second television camera positioned in front of the television screen of said display apparatus, said second television camera having an input connected to the second control output of said camera controller, and an output;

a selector switch having a first input connected to the output of said second television camera, a second input, and an output; and a projector mounted upon said helmet, said projector having an input connected to the output of said selector switch.

8. The head trackable wide angle visual display system simulator of claim 7, wherein said roll buffer circuit comprises:

a variable gain amplifier having an input connected to the first data output of said head tracker, and an output connected to the input of said roll delay circuit;

a first selector switch having a first input connected to the output of said variable gain amplifier, a second input connected to the output of said roll delay circuit; and an output;

an inverting amplifier having an input connected to the output of said first selector switch, and an output;

a second selector switch having a first input connected to the output of said inverting amplifier, a second input connected to the output of said first selector switch, and an output;

a summing amplifier having an input connected to the output of said second selector switch, and an output; and a buffer amplifier having an input connected to the output of said summing amplifier.

9. The head trackable wide angle visual display system simulator of claim 7, wherein said roll delay circuit comprises:

an adjustable frequency clock signal generator having an output;

a trigger flip-flop having a clock input connected to the output of said adjustable frequency clock signal generator, a Q output, and a $\bar{Q}$ output;

a first level shifting amplifier having an input connected to the first data output of said roll buffer circuit, and an output;

an analog shift register having a first clock input connected to the Q output of said trigger flip-flop, a second clock input connected to the $\bar{Q}$ output of said trigger flip-flop, a data input connected to the output of said first level shifting amplifier, and an output;

a filter network having an input connected to the output of said analog shift register, and an output; and a second level shifting amplifier having an input connected to the output of said filter network.

10. The head trackable wide angle visual display simulator of claim 7, wherein said horizontal and vertical summing circuits each comprise:

a first input terminal;

a variable gain amplifier having an input connected to said first input terminal, and an output;

a second input terminal;

a first selector switch having a first input connected to the output of said first variable gain amplifier, a second input connected to said second input terminal, and an output;

a first inverting amplifier having an input connected to the output of said first selector switch, and an output;

a second selector switch having a first input connected to the output of said first inverting amplifier, a second input connected to the output of said first selector switch, and an output;

a third input terminal;

a second variable gain amplifier having an input connected to said third input terminal, and an output;

a fourth input terminal;

a third selector switch having a first input connected to the output of said second selector switch, a second input connected to said fourth input terminal, and an output;

a second inverting amplifier having an input connected to the output of said third selector switch, and an output;

a fourth selector switch having a first input connected to the output of said second inverting amplifier, a second input connected to the output of said third selector switch, and an output;

a summing amplifier having an input effectively connected to the output of said second and fourth selector switches, and an output; and a buffer amplifier having an input connected to the output of said summing amplifier.

11. The head trackable wide angle visual display system simulator of claim 7, wherein said horizontal and vertical display lines each comprise:

an adjustable frequency clock signal generator having an output;

a first trigger flip-flop having a clock input connected to the output of said adjustable frequency clock signal generator, a Q output, and a $\overline{Q}$ output;

a first input terminal;

a first level shifting amplifier having an input connected to said first input terminal;

a first analog shift register having a first clock input connected to the Q output of said trigger flip-flop, a second clock input connected to the $\overline{Q}$ output of said trigger flip-flop, a data input connected to the output of said first level shifting amplifier, and an output;

a first filter network having an input connected to the output of said first analog shift register, and an output;

a second level shifting amplifier having an input connected to the output of said first filter network;

a second trigger flip-flop having a clock input connected to the output of said adjustable frequency clock signal generator, a Q output, and a $\overline{Q}$ output;

a second input terminal;

a third level shifting amplifier having an input connected to said second input terminal, and an output;

a second analog shift register having a first clock input connected to the Q output of said second trigger flip-flop, a second clock input connected to the $\overline{Q}$ output of said second trigger flip-flop, a data input connected to the output of said third level shifting amplifier, and an output;

a second filter network having an input connected to the output of said second analog shift register, and an output; and a fourth level shifting amplifier having an input connected to the output of said second filter network.

12. The head trackable wide angle visual display system simulator of claim 7, wherein said visual target comprises an aircraft.

13. The head trackable wide angle visual display system simulator of claim 7, further characterized by a reflective display screen spatially disposed downstream from the projector mounted upon said helmet.

14. The head trackable wide angle visual display system simulator of claim 7, further characterized by:

a computer having a first input connected to the output of said roll buffer circuit, a second input connected to the output of said horizontal summing circuit, a third input connected to the output of said vertical summing circuit, and an output; and a computer image generator having an input connected to the output of said computer, and an output connected to the second input of said selector switch.

* * * * *